US006280800B1

(12) United States Patent
Thiele et al.

(10) Patent No.: US 6,280,800 B1
(45) Date of Patent: Aug. 28, 2001

(54) PROCESS FOR COATING METALLIC SUBSTRATE SURFACES

(75) Inventors: Olaf Thiele, Altheim; Frank Zimmermann, Frontenhausen, both of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/484,151

(22) Filed: Jan. 18, 2000

(51) Int. Cl.$^{7}$ .......... C08F 2/48
(52) U.S. Cl. .......... 427/508; 427/180; 427/258; 427/287; 427/318; 427/327; 427/388.1; 427/435; 427/512; 427/553; 427/558; 427/559
(58) Field of Search .......... 427/508, 512, 427/553, 558, 559, 258, 389.1, 318, 287, 327, 435, 180

(56) References Cited

U.S. PATENT DOCUMENTS 5,091,647 * 2/1992 Carduner et al. .
5,512,639 4/1996 Rehfuss et al. .......... 525/456
5,639,560 6/1997 Moens et al. .......... 428/482

FOREIGN PATENT DOCUMENTS 2157658 3/1996 (CA) .
WO 99/41323 8/1999 (WO) .

OTHER PUBLICATIONS

K. Baer, Crosslinking of Powder Paints in a Few Seconds, *Fokussierte NIR–Technologie* (Abstract Only), 26–29, 1998 (No month avail.).
T. Molz et al., Modern Pretreatment Procedures for Steel and Zinc Surfaces, *Tagungsband der DFO–Pulverlacktagung* (Abstract Only), 23, 201–207, 1996, (No month avail.).

* cited by examiner

*Primary Examiner*—Bernard Pianalto
(74) *Attorney, Agent, or Firm*—Joseph A. Tessari

(57) ABSTRACT

Metal surfaces which are pre-treated with high-energy NIR-radiation and then coated with a powder or a liquid coating composition, followed by curing or drying the coating composition, show better adhesion to the coating and improved appearance and performance and the process is more cost effective.

9 Claims, No Drawings

PROCESS FOR COATING METALLIC SUBSTRATE SURFACES

BACKGROUND OF THE INVENTION

The present invention relates to a process for coating metallic substrates with a powder coat or a liquid coat including the pre-treatment of the substrate surface.

Using powder coats to provide decorative or functional coating of surfaces has been widely used in the coating of metals due to the high economic efficiency of the process as well as its wide acceptance from the point of view of environmental protection. Numerous powder coat compositions have been developed for different applications. The known processes for coating with powder coats require that the metal surface to be coated must be subjected to a costly, generally aqueous pre-treatment process. Without such pre-treatment, the adherence of powder coat layers and hence the corrosion protective effect is insufficient. Such costly pre-treatments are also necessary for the application of aqueous or solvent-containing liquid coats on metal surfaces.

After their application, powder and liquid coats can be cured, or dried and cured, by means of radiation having wavelengths in the near infrared (NIR) region. In the field of powder coating, NIR-technology enables melting and curing of powder coats to be carried out in a single process step, see for example K. Bär, JOT 2/98, pp. 26 to 29 and WO 99/41323. A uniform heating of the whole coating layer is achieved. Such NIR-curing processes also require costly pre-treatment methods for the substrate surface prior to coating.

The pre-treatment of steel or aluminium consists generally of at least several processing steps. First of all, the removal of fats, oils or other impurities is carried out, for example by an alkaline washing using a dip or spray technique. A subsequent interim rinse is generally followed by a wet-chemical deposit of inorganic corrosion protection layers on the surface (for example, phosphating in the case of steel, chromatising in the case of aluminium). A rinsing operation with fresh water or demineralised water is again required in order to completely remove adhered reaction chemicals. The damp metal surface must be dried completely before the subsequent application of the powder or liquid coat layer in order to avoid coating faults. Typical pre-treatment methods for the powder coating of metal surfaces are described for example in T. Molz, Tagungsband der DFO-Pulverlacktagung, 23.-24.9.1996, pages 201 to 207.

This pre-treatment of metal substrates or metal parts prior to coating with powder or liquid coats requires large dip coating tanks or spraying cabins involving considerable investment and operating costs. The chemicals used in the different reaction zones must be kept strictly separate from each other, and spent pre-treatment solutions must be disposed of at high cost. If faults occur in the pre-treatment, faults in the subsequent coating are unavoidable.

SUMMARY OF THE INVENTION

The object of the present invention is accordingly to provide a process for coating metal surfaces with powder or liquid coating composition, which avoids an expensive pre-treatment of the substrate surface prior to the coating application.

This object is achieved by a process in which metal surfaces are irradiated with high-intensity radiation in the NIR region, the irradiated metal surfaces are subsequently coated with a powder and/or a liquid coating composition, and the powder or liquid coat layer than is dried and/or cured.

The process is also characterised in that the drying and/or curing of the powder coat layer or the liquid coat layer is realised preferably by means of NIR-radiation or UV-radiation, more preferably by means of NIR-radiation.

DETAILED DESCRIPTION OF THE INVENTION

According to the invention the metallic surfaces which are not pre-treated in the usual manner are irradiated with high-intensity NIR-radiation, with a wavelength generally in the range from 730 to 1200 nm (near infrared). The irradiation can take place with an intensity of for example more than 1 W/cm$^2$, preferably more than 100 W/cm$^2$, and over a time period preferably ranging from 1 to 60 seconds, more preferably from 1 to 10 seconds. In general the duration of the NIR-pre-treatment can be from 0.5 to 300 seconds.

Following the pre-treatment by NIR-irradiation of the metal surface according to the invention, the subsequent coating with powder or liquid coating compositions can be carried out, where appropriate as a one-layer or multi-layer coating. The subsequent drying or curing of the coating layers can be carried out in the usual way by methods known in the coating industry. Preferably the drying or curing process can be carried out by means of NIR-radiation or UV-radiation, more preferably by means of NIR-radiation.

The metallic surfaces to be treated according to the invention need not be pre-treated, i.e. no conventional pre-treatment methods are required, such as for example degreasing and passivation (for example phosphating, chromatising).

It is advantageous to clean the metal surfaces to be treated according to the invention of their mechanical impurities e.g. abrasive dust, boring and milling chippings, flash rusting or dust prior to their NIR-pre-treatment. To remove such impurities, known mechanical methods e.g. brushing, vacuum or compressed air cleaning, "sweeping" as well as sandblasting can be used for the coarser impurities or for flash rusting.

As a result of the irradiation with high-energy NIR-radiation according to the invention, heating of the metal surface can occur. Such heating does not have a negative influence on the subsequent powder coating process or on the application of the liquid coat layer, but in fact surprisingly results in an improved coating operation.

Halogen lamps, especially high-performance halogen lamps, for example, suitable for the pre-treatment step in the process according to the invention, can be used as the NIR source. Such radiation emitters with an emission spectrum maximum wavelength between 730 and 1200 nm are suitable.

Coating with thermally cross-linking as well as UV-curing powder coating compositions, or water-based or solvent-containing liquid coating compositions preferably takes place directly after the NIR-pre-treatment of the metal surface. If required, it is also possible to separate in time the pre-treatment according to the invention from the subsequent coating.

Fundamentally, all processes are suited to the application of powder coating compositions and to the application of liquid coating compositions. With regard to the powder composition, electrostatic spray techniques as used in the known corona or tribo processes are particularly preferred.

It is also possible to use other known powder application methods, for example application in the form of an aqueous dispersion or "powder slurry". The liquid coating compositions can be applied on the substrate for example by the well known methods of dipping or spraying.

Known conventional thermally cross-linking powders can be used as the powder coating compositions. In this case thermal curing methods can be used for the subsequent curing of the powder coats, for example heating by means of convection ovens or medium wavelength infrared radiation.

After the pre-treatment according to the invention, it is also possible to apply powder coating compositions that can be cured with UV-radiation. Such powder coats are described for example in European patent applications EP 739922, EP 702067 or EP 636660. Directly after the NIR-pre-treatment, a UV-curing powder coat can be applied on the substrate surface and can be cured in a few seconds by UV-radiation. The residual heat of the NIR-pre-treatment is sufficient to melt the UV-powder coat and to obtain the flow of the coating layer, without the input of further heat. This alternative process according to the invention creates the possibility of a powder coating process with a very low energy consumption.

Powder coating compositions that are suitable for being cured by means of NIR-radiation can also be used. Such powder coats are described for example in WO 99/41323. When such powder coats are used, it is preferred to cure the powder coat layer directly after its application by irradiating it with NIR-radiation. In this case according to the invention, the powder initially melts and then cures in a very short time and a distinct shortening of the curing time of the powder coats in comparison with the conventional pre-treatment can be obtained.

Preferably powder coating compositions are used that are suitable for being cured by means of NIR-radiation or UV-radiation, more preferably by means of NIR-radiation.

Liquid coats that can be used, for example, are water-dilutable or solvent-containing coating compositions which are commonly used and known to those skilled in the art and which can be used, for example, as single or multi-layer, coloured or colourless coatings on substrates for use as fillers, basecoats or top or clearcoats in the car industry or in the industrial coating area. After their application, they can be dried by well known methods over a longer period of time at room temperature or subjected, where appropriate after a flash-off time, to drying or curing at a higher temperature. Furthermore, curing by means of high-energy radiation, for example UV-radiation, is possible. Flashing off, drying or curing is also possible, for example, by means of exposure to NIR-radiation.

The coatings obtained by the process according to the invention, especially the powder coatings, have an excellent adherence, a good corrosion resistance and an excellent flow. Coating faults such as craters, fisheyes or adherence defects that generally appear in the coating of untreated metal surfaces, can be avoided by the process according to the invention.

The process for the pre-treatment of metal surfaces with NIR-radiation according to the present invention permits considerable savings on investment, energy, and operating costs, waste water and waste materials. The organic impurities that are generally present on the surface, such as fat and oil residues or other impurities, for example fingerprints, are removed by the process according to the present invention, whereby the time needed for the pre-treatment ranging from 10 to 30 minutes for conventional pre-treatment methods is shortened to a few seconds. In particular, in combination with curing of coating layers by means of NIR-radiation, a very high throughput for the coating is possible, especially for the powder coating.

EXAMPLES

The following examples illustrate the invention:

Example 1

NIR-pre-treatment of a Steel Surface and Subsequent Coating with NIR-curing Powder Coat A cylindrical steel tube polluted with oils and fats resulting from its production process and from its treatment for protection against flash rusting was irradiated, while rotating, from a distance of 6 cm with a conventional NIR-radiation emitter (power 1000 W) for 10 seconds, whereby the surface heated up to a temperature between 100° C. and 120° C. A NIR-powder coat DUROTHERM RAY-TEC NIR-9216 (commercial product of DuPont Pulverlack GmbH & Co.KG) was applied on the surface that had been pre-treated in this way, and melted on the pre-tempered surface. A further NIR-radiation emitter subsequently completely cured the powder coat layer in 8 seconds. A homogeneous flow surface resulted, free of pores and blisters, with excellent adherence to the substrate and with the following properties:

| | |
|---|---|
| Adherence Test (DIN 53131) | Cross hatch 0 |
| Corrosion Test (DIN 50021) | After 500 hrs, under surface rusting <1 mm, no blistering |
| Constant atmosphere of condensation water (DIN 50017) | After 500 hrs, under surface rusting <1 mm, no blistering |

Comparative Example 2

Coating of an Untreated Steel Surface with NIR-curing Powder Coat

A steel tube polluted with oils and fats analogous to Example 1 was coated, without pre-treatment according to the invention with a NIR-powder coat DUROTHERM RAY-TEC NIR-9216 and subsequently irradiated, while rotating, from a distance of 6 cm with a NIR-radiation emitter with a power of 1000 W for a duration of 18 seconds. During this time, melting and curing of the powder coat layer occurred. Blisters developed on the surface during the melting process, craters formed due to insufficient wetting and some regions remained unwetted over large areas. Testing of the coating properties provided the following results:

| | |
|---|---|
| Adherence Test (DIN 53131) | Cross hatch 2 |
| Corrosion Test (DIN 50021) | After 500 hrs, under surface rusting <4 mm, blisters rated at m2g2 |
| Constant atmosphere of condensation water (DIN 50017) | After 500 hrs, under surface rusting <1 mm, blisters rated at m1g1 |

Example 3

NIR-pre-treatment of a Steel Surface and Subsequent Powder Lacquer Coating and Convection Curing A steel plate polluted with oils and fats resulting from its production process and its treatment for protection against flash rusting was used. The plate was irradiated with a conventional NIR-radiation emitter (1000 W) from a distance of 8 cm for a duration of 12 seconds. The surface of the steel plate was thereby thermally activated and was heated superficially to a temperature of 130° C. The steel plate was subsequently coated with a conventional thermoreactive powder coat on a base of polyester/triglycidylisocyanurate resin/hardener system and the powder coat layer was cured in a convection oven at 200° C. for 15 minutes. An analysis of the coating obtained provided the following results:

| | |
|---|---|
| Adherence Test (DIN 53131) | Cross hatch 0 |
| Corrosion Test (DIN 50021) | After 500 hrs, under surface rusting <1 mm, no blistering |
| Constant atmosphere of condensation water (DIN 50017) | After 500 hrs, under surface rusting <1 mm, no blistering |

Example 4

NIR-pre-treatment of an Aluminium Surface and Subsequent Coating with a Water Primer An aluminium profile in an uncleaned condition for use in the window construction industry was irradiated with a NIR-radiation emitter with a power of 1500 W from a distance of 5 cm and at a conveyor speed of 8 m/min. After a cooling distance of 4 m, the profile strip was coated with a conventional aqueous primer that was dried subsequently with a NIR-radiation emitter with a power of 500 W from a distance of 10 cm. A pore-free coating with good adherence was obtained, the properties of which corresponded to a coating with the primer on a conventionally pre-treated support.

Example 5

NIR-pre-treatment and Subsequent Coating with an UV-curing Powder Coat

A grey cast iron plate about 12 mm thick was irradiated from a distance of 5 cm with a NIR-radiation emitter with a power of 1500 W for 10 seconds. The plate heated up superficially to a temperature of 130° C. The grey cast iron plate was subsequently coated with a conventional UV-curing powder coat (UV-TEC UP-023-9490-0, commercially available from DuPont Pulverlack GmbH&Co. KG), melted with a conventional IR-radiation emitter and cured with a conventional UV-radiation emitter. The coating obtained was free of surface defects and showed excellent adherence on the support.

What is claimed is:

1. Process for coating metal surfaces comprising the steps of:

(a) cleaning an uncoated metal surface by irradiation with high-energy NIR-radiation; and (b) applying a coating composition to the cleaned uncoated metal surface, said coating composition selected from the group consisting of powder compositions and liquid compositions.

2. The process according to claim 1, further comprising the step of irradiating the coating composition with NIR-radiation or UV-radiation to effect drying and curing.

3. The process according to claim 1, wherein the coating composition is a powder composition.

4. The process according to claim 1, wherein the cleaning step (a) comprises irradiating the uncoated metal surface with NIR-radiation at a wavelength ranging from 730 to 1200 nm and with an intensity of more than 1 $W/cm^2$.

5. The process according to claim 1, wherein the cleaning step (a) lasts from 1 to 60 seconds in duration.

6. The process according to claim 1, wherein step (b) follows immediately from step (a).

7. The process of claim 1, wherein step (a) is the only cleaning process applied to the uncoated metal surface.

8. A coated metal surface prepared by a process in which the metal surface is cleaned by irradiation with high-energy NIR-radiation prior to any coating being applied thereto; and then applying a coating composition to the cleaned metal surface, wherein said coating composition is selected from the group consisting of powder compositions and liquid compositions.

9. Process for coating metal surfaces comprising the steps of:

(a) cleaning the entire metal surface to be coated by exposing said surface to high-energy NIR-radiation; and (b) applying a coating composition to the cleaned metal surface, said coating composition selected from the group consisting of powder compositions and liquid compositions.

* * * * *